(12) United States Patent
Chen et al.

(10) Patent No.: US 6,909,997 B2
(45) Date of Patent: Jun. 21, 2005

(54) METHOD AND SYSTEM FOR DATA FUSION USING SPATIAL AND TEMPORAL DIVERSITY BETWEEN SENSORS

(75) Inventors: Hai-Wen Chen, Orlando, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 133 days.

(21) Appl. No.: 10/395,269

(22) Filed: Mar. 25, 2003

(65) Prior Publication Data

US 2003/0184468 A1 Oct. 2, 2003

Related U.S. Application Data

(60) Provisional application No. 60/367,282, filed on Mar. 26, 2002.

(51) Int. Cl.[7] .............................................. G06F 17/40
(52) U.S. Cl. ...................... 702/189; 702/190; 702/192; 702/193
(58) Field of Search ................................ 702/190, 192, 702/51–53, 187, 189, 191, 196; 700/31; 345/173; 701/214

(56) References Cited

U.S. PATENT DOCUMENTS

| | | | |
|---|---|---|---|
| 5,696,714 A | * | 12/1997 | Russell ........................ 365/106 |
| 6,546,378 B1 | * | 4/2003 | Cook ........................... 706/12 |
| 6,609,094 B1 | * | 8/2003 | Basu et al. ................... 704/240 |
| 6,738,697 B2 | * | 5/2004 | Breed .......................... 701/29 |
| 6,744,496 B2 | * | 6/2004 | Audouin et al. ........... 356/73.1 |
| 2004/0106211 A1 | * | 6/2004 | Kauer et al. ................ 436/169 |

* cited by examiner

Primary Examiner—Marc S. Hoff
Assistant Examiner—Felix Suarez
(74) Attorney, Agent, or Firm—Birch, Stewart, Kolasch & Birch, LLP

(57) ABSTRACT

A method and system provide a multi-sensor data fusion system capable of adaptively weighting the contributions from each one of a plurality of sensors using a plurality of data fusion methods. During a predetermined tracking period, the system receives data from each individual sensor and each data fusion method is performed to determine a plurality of reliability functions for the system based on combining each sensor reliability function which are individually weighted based on the S/N (signal-to-noise) ratio for the received data from each sensor, and a comparison of predetermined sensor operation characteristics for each sensor and a best performing (most reliable) sensor. The system may dynamically select to use one or a predetermined combination of the generated reliability functions as the current (best) reliability function which provides a confidence level for the multi-sensor system relating to the correct classification (recognition) of targets and decoys.

28 Claims, 8 Drawing Sheets

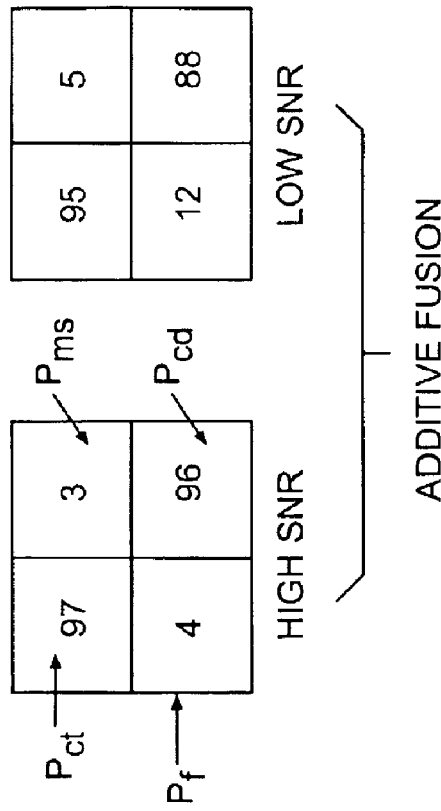
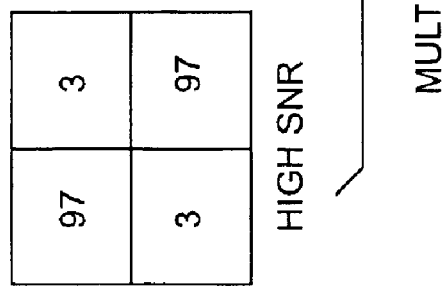
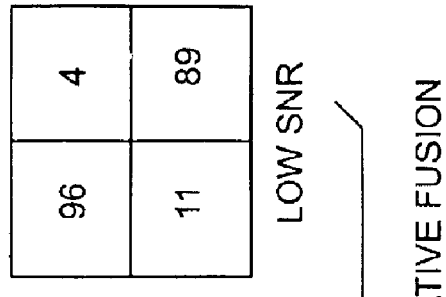
FIG. 4a  FIG. 4b  FIG. 4c  FIG. 4d

METHOD AND SYSTEM FOR DATA FUSION USING SPATIAL AND TEMPORAL DIVERSITY BETWEEN SENSORS

CROSS-REFERENCE

This application claims the benefit of U.S. provisional application Ser. No. 60/367,282, filed Mar. 26, 2002.

TECHNICAL FIELD

The present invention relates generally to data fusion. It particularly relates to a data fusion method that dynamically selects at least one fusion technique to integrate data from a plurality of sensors having spatial and temporal diversity.

BACKGROUND OF THE INVENTION

Sensor systems incorporating a plurality of sensors (multi-sensor systems) are widely used for a variety of military applications including ocean surveillance, air-to-air and surface-to-air defense (e.g., self-guided munitions), battlefield intelligence, surveillance and target detection (classification), and strategic warning and defense. Also, multi-sensor systems are used for a plurality of civilian applications including condition-based maintenance, robotics, automotive safety, remote sensing, weather forecasting, medical diagnoses, and environmental monitoring (e.g., weather forecasting).

To obtain the full advantage of a multi-sensor system, an efficient data fusion method (or architecture) may be selected to optimally combine the received data from the multiple sensors. For military applications (especially target recognition), a sensor-level fusion process is widely used wherein data received by each individual sensor is fully processed at each sensor before being output to a system data fusion processor. The data (signal) processing performed at each sensor may include a plurality of processing techniques to obtain desired system outputs (target reporting data) such as feature extraction, and target classification, identification, and tracking. The processing techniques may include time-domain, frequency-domain, multi-image pixel image processing techniques, and/or other techniques to obtain the desired target reporting data.

An exemplary, prior art example of a multi-sensor, sensor-level fusion (process) system 100 for automatic target recognition (ATR) is shown in FIG. 1. Advantageously, system 100 may include a plurality of sensors 102, 104, 106, 108 which may include RF sensors such as MMW radar (active sensor) 102, MMW radiometer (passive sensor) 104, IR laser radar 106, and passive IR sensor 108 (e.g., FLIR or IRST—infrared search and track). Additionally, multi-sensor system 100 may include data processor portion 118 which includes sensor parallel processor 120 and data fusion processor 122 which advantageously executes at least one predetermined algorithm to produce a valid target declaration output 124. Each sensor may scan a predetermined area (field of view) for an object (target) and receive data using antenna 110 (for the MMW sensors 102, 104) or lens 114, 116 (for IR sensors 106, 108). In accordance with the sensor-level fusion architecture selected, each sensor may have its individually received data processed (via parallel processor 120) using the predetermined algorithm that may be designed in accordance with a plurality of predetermined system parameters including received frequency band, active or passive operating mode of the individual sensor, sensor resolution and scanning characteristics, target and background signatures, and other predetermined system parameters. Results of the individual sensor processing may be input as a target report to the data fusion processor 122 (in response to a cue/query from the data fusion processor) where the results may be combined (fused) in accordance with the predetermined algorithm to produce an output decision 124 such as "validated target" or "no desired target encountered". Other output decisions 124, such as tracking estimates, may be produced in accordance with multi-sensor system output requirements. The tracking estimates may be used to form new tracking results, update existing tracking, and estimate future positions of the object (target).

Many multi-sensor systems (such as system 100 in FIG. 1) use feature-level fusion wherein features that help discriminate (find small distinctions) among objects (targets) are extracted from each individual sensor's data and then combined to form a composite feature vector representative of the object in each sensor's field of view. The composite feature vector may be input to a data processor (or neural network) and classification (recognition of the object as a house, tank, truck, man, etc.) of the object may then occur using a predetermined algorithm (incorporating the previously described processing techniques) to recognize the object of interest, differentiate the object from decoys (false targets), and produced a weighted value (e.g., reliability value) that links the observed object to a particular (predetermined) target with some probability, confidence, threat priority, or other categorical parameter.

Currently, feature-level, multi-sensor systems exclusively use one of a wide variety of data fusion methods (strategies) which may include multiplicative fusion (e.g., Bayes or Dempster-Shafer methods), data fusion using fuzzy logic (e.g., min, max calculations), or another data fusion method. The use of only a single data fusion method may reduce the confidence (reliability or probability) level of the system output since a different data fusion method (or the combination of different methods with the current method) may generate a higher (more optimum) reliability level for the plurality of sensors (which may have different sensor reliability levels over different tracking periods due to different sensor constraints, atmospheric conditions, or other factors) and thus may produce a less accurate data fusion output (target classification) when using only a single data fusion method. Additionally, under certain conditions, a data fusion reliability output (using data from all sensors) may be worse than a single sensor reliability output.

Therefore, due to the disadvantages of the current multi-sensor system using only a single data fusion method, there is a need to provide a multi-sensor system that adaptively weights the contributions from each sensor using a plurality of data fusion methods. The system may perform each data fusion method to generate a plurality of reliability functions for the plurality of sensors, and then dynamically select to use one, or a predetermined combination, of the generated reliability functions as the current (best) reliability function for improved reliability of system target classification. Also, there is a need to provide a multi-sensor data fusion system that can dynamically (adaptively) switch to a single sensor reliability output when predetermined conditions arise making the single sensor output better than a data fusion output.

SUMMARY OF THE INVENTION

The method and system of the present invention overcome the previously mentioned problems by providing a multi-sensor data fusion system capable of adaptively weighting the contributions from each one of a plurality of sensors using a plurality of data fusion methods. During a predetermined tracking period, the system receives data from each individual sensor and each data fusion method is performed to determine a plurality of reliability functions for the system based on combining each sensor reliability function which are individually weighted based on the S/N (signal-to-noise) ratio for the received data from each sensor, and a comparison of predetermined sensor operation characteristics for each sensor and a best performing (most reliable) sensor. The system may dynamically select to use one or a predetermined combination of the generated reliability functions as the current (best) reliability function to provide a confidence level for the multi-sensor system relating to the correct classification (recognition) of targets and decoys.

BRIEF DESCRIPTION OF THE DRAWINGS

FIGS. 4a–4d show diagrams of exemplary sensor classification results for a multi-sensor system using different spatial fusion methods in accordance with embodiments of the present invention.

DETAILED DESCRIPTION

Figure 1:
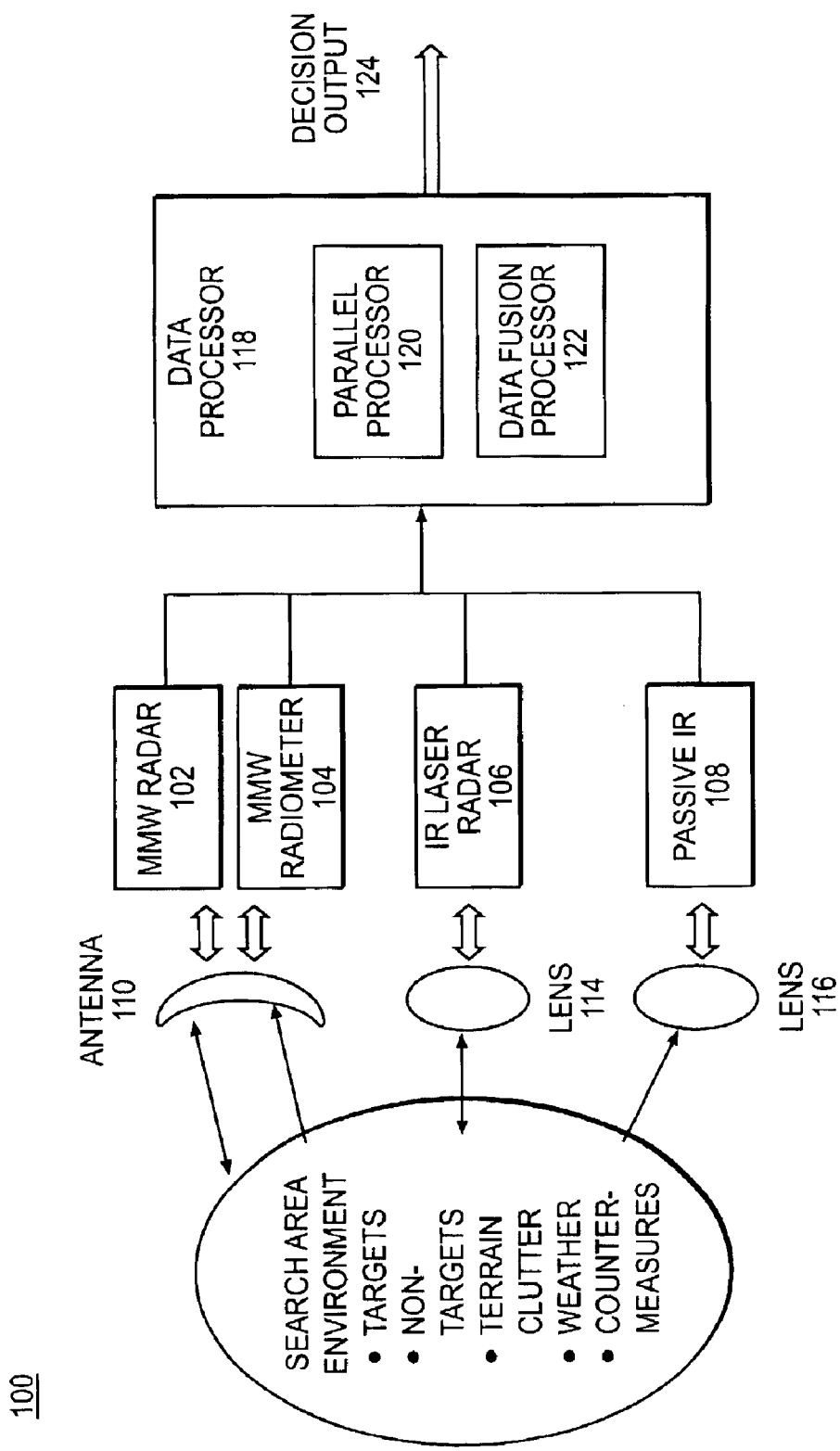
FIG. 1 is a block diagram of an exemplary sensor-level data fusion system found in the prior art.
Figure 2:
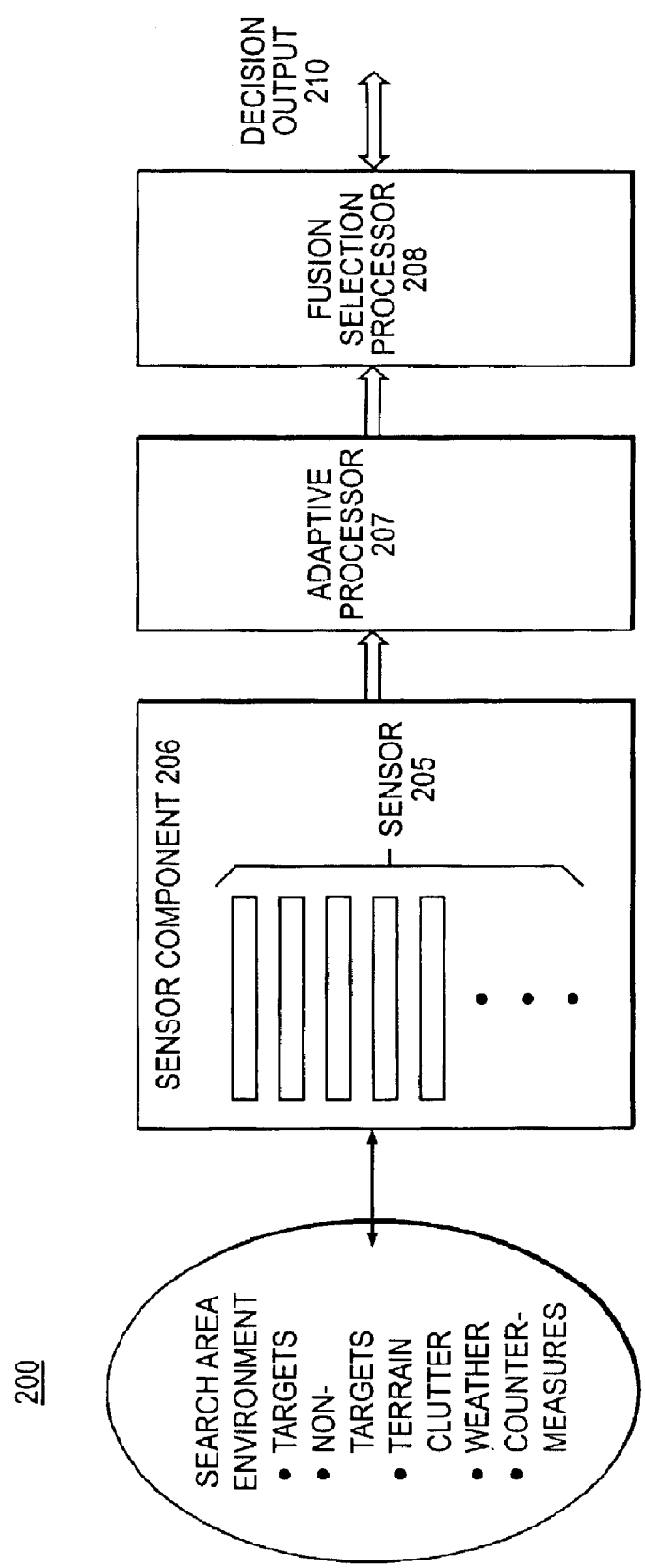
FIG. 2 is a functional block diagram of an exemplary sensor-level data fusion system in accordance with embodiments of the present invention.
Figure 3A:
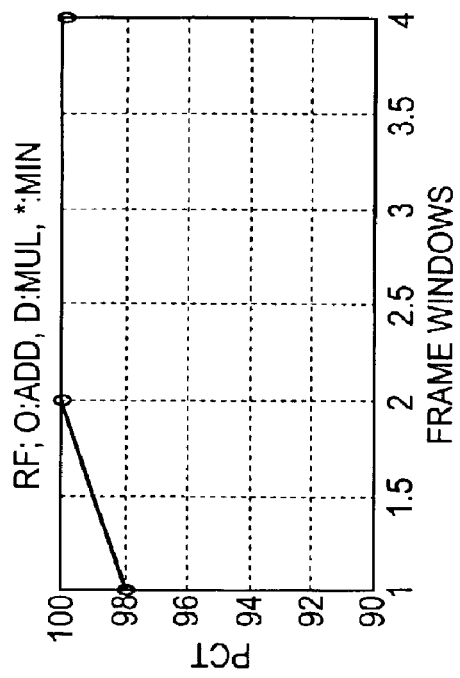
FIGS. 3a–3d show diagrams of exemplary sensor classification results for a multi-sensor system using a plurality of different temporal fusion methods in accordance with embodiments of the present invention.
Figure 3C:
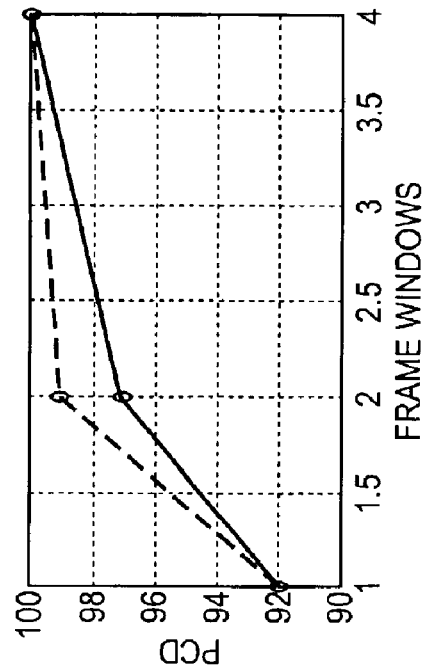
Figure 3B:
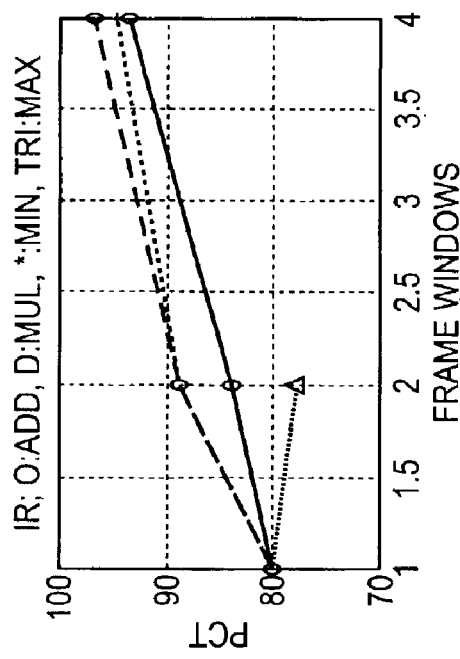
Figure 3D:
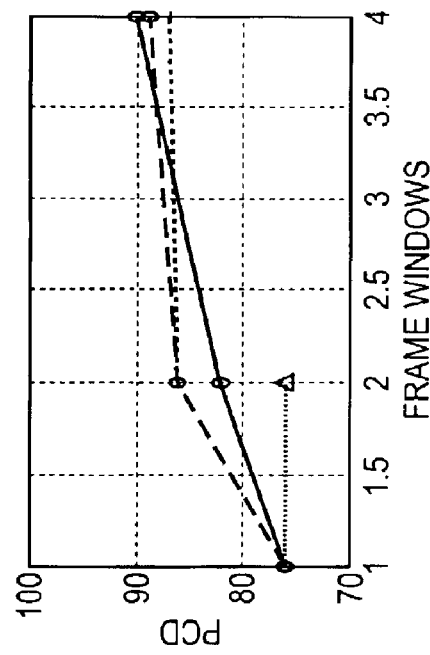

FIG. 2 shows a functional block diagram of an exemplary multi-sensor, sensor-level data fusion system 200 in accordance with embodiments of the present invention. Advantageously, multi-sensor system 200 may include sensor component 206, adaptive processor 207, and data fusion (integration) selection processor 208. Sensor component 206 may include a plurality of sensors 205 (and associated sensor processors) to receive and compute data from an object (target) within a predetermined scanning area (field of view) where the scanning data may include acoustic, electromagnetic (e.g., signal strength, SNR—signal-to-noise ratio, etc.), motion (e.g., range, direction, velocity, etc.), temperature, and other types of measurements/calculations of the object scanning area. It is noted that the FIG. 2 illustration of adaptive processor 207 and data fusion selection processor 208 as separate components is solely exemplary, and should not be viewed as a limitation upon the present invention as the two components may be combined into a single component and still be within the scope of the present invention.

The plurality of sensors 205, using associated sensor processors, may each perform the well-known process of feature extraction to detect and pull out features which help discriminate the objects in each sensor's field of view and combine all the feature extractions (from each sensor) as a composite input to adaptive processor 207. Operating in combination, adaptive processor 207 and data fusion selection processor 208 may perform, as described in detail later, all levels of discrimination (detection, classification—recognition, identification, and tracking) of the object (target) using at least one predetermined algorithm (e.g., data fusion) to recognize the object of interest, differentiate the object from decoys (false targets), and produce at least one (or a predetermined combination of two or more) weighted, (system) reliability function that links the observed object to a predetermined target with some confidence level. The system reliability function may be used to generate a decision output 210 (target report) for target detection such as "validated target" or "no desired target encountered". Also, alternatively, plurality of sensors 205 may feed-through (without processing or with minimal processing) received data to processors 207, 208 for feature extraction and target discrimination processing.

The particular combination of sensors 205 for system 200 may include a number of different sensors selected to provide exemplary predetermined system attributes (parameters) including temporal and spatial diversity (fusion), sensitivity, bandwidth, noise, operating range, transmit power, spatial resolution, polarization, and other system attributes. These different sensors may include, but are not limited to, passive and/or active sensors operating in the RF (radio frequency) range such as MMW (millimeter-wave) sensors, IR (infrared) sensors (e.g., Indium/Antimony—InSb focal plane array), laser sensors, and other passive and/or active sensors useful in providing the exemplary predetermined system attributes.

Figure 7:
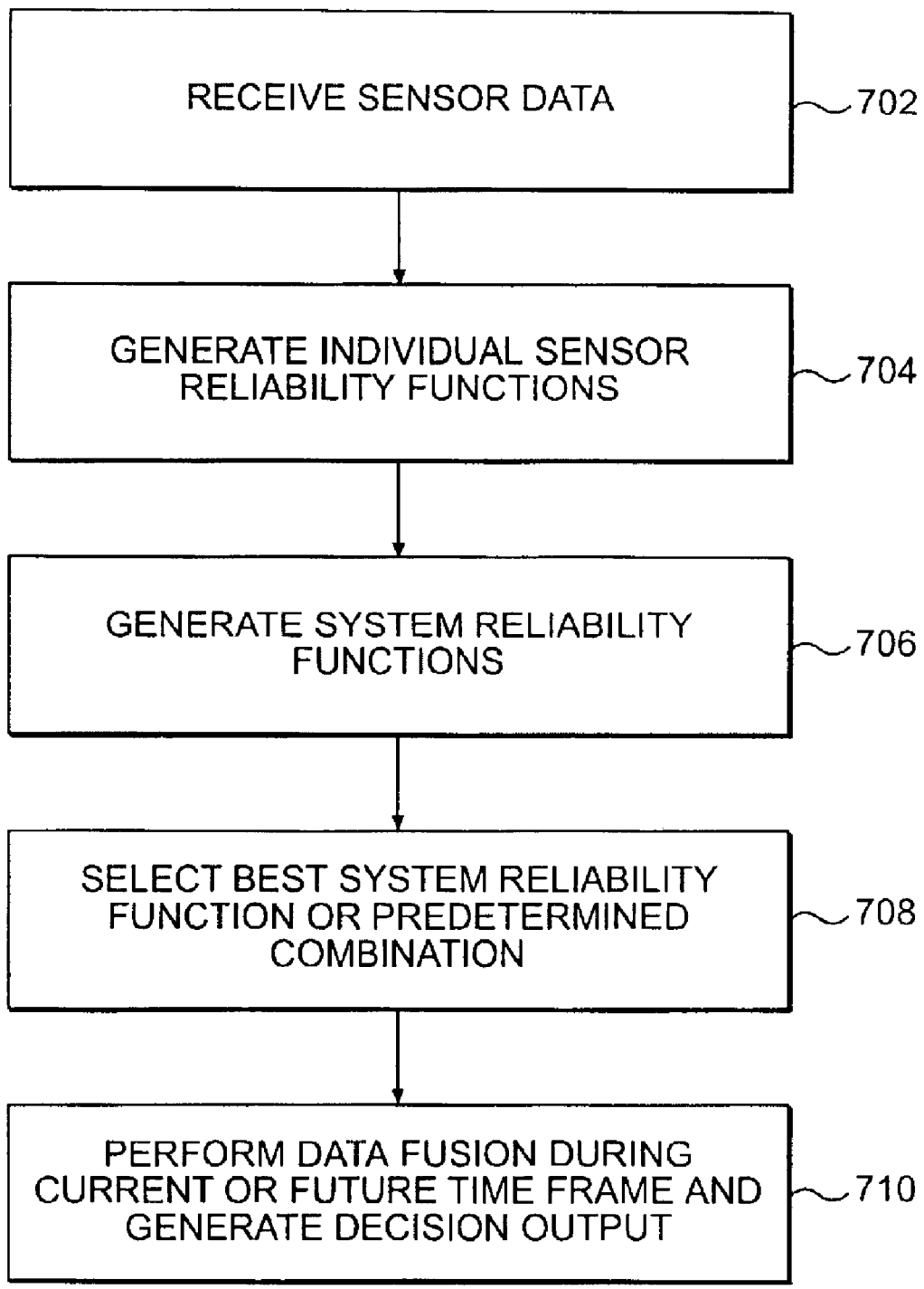
FIG. 7 shows a flowchart of an exemplary data fusion process in accordance with embodiments of the present invention.

During exemplary operation as described herein and in accordance with the flow process diagram shown in FIG. 7, at step 702, each one of the plurality of (differently located) sensors 205 may receive and calculate (compute) data about the object during a predetermined time (tracking) period over a plurality of time frames to provide spatial and temporal diversity for system 200. The computed data may include signal measurements (e.g., noise, radiance, reflection level, etc.) that are used to determine SNR (signal-to-noise ratio) for each sensor during the predetermined tracking period. Thereafter, at step 704, the computed SNR for each one of the plurality of sensors 205 may be used by adaptive processor 207 to generate a plurality of sensor reliability functions for each sensor. Each different sensor reliability function (generated for each sensor) may be produced by using each one of a plurality of different fusion methods. The plurality of different fusion methods may include, but are not limited to, additive fusion, multiplicative fusion (e.g., Bayes and/or Dempster-Shafer), fuzzy logic fusion using minimum and/or maximum calculations, and other fusion methods (strategies) that help to minimize the errors associated with noise. Likelihood function (pdf) calculations for each fusion method are shown in Appendix A.

Following step 704 of generating individual sensor reliability functions using each different fusion method, at step 706, adaptive processor 207 (in accordance with a predetermined algorithm using adaptive weighting as described in detail later) may generate a plurality of overall (combined) reliability functions for system 200 for each different fusion method. The plurality of generated system reliability functions may be input to data fusion selection processor 208. Then, at step 708, fusion selection processor 208 may select one or a predetermined combination of the plurality of combined reliability functions as the current (best) reliability function for system 200. Thereafter, at step 710, data fusion may be immediately performed (or delayed to a subsequent, predetermined time frame) and a decision output (target report) may be generated using the combined system reliability function that was selected.

For multi-sensor system 200, there may be variations in sensor reliability among the plurality of sensors 205 (e.g., based on variations in SNR and other factors) during the tracking period such that adaptive processor 207 (when generating individual/system sensor reliability functions) may determine and assign a higher weight to a best performing sensor (with the highest SNR) than a (lower) weight assigned to a worse (or worst) performing sensor (e.g., with a lower SNR) such that a fused result (combined reliability function for the plurality of sensors) may be weighted more towards the best performing (highest reliability) sensor. The variations in sensor reliabilities for the plurality of sensors 205 may be caused by a number of factors including weather conditions, different sensor attributes such as better range accuracy of an RF sensor than an IR sensor at longer ranges, or other factors causing at least one sensor to perform better than another sensor during a predetermined tracking period.

Advantageously during operation as described herein, the SNR may be used by adaptive processor 207 as a measure of sensor reliability during a predetermined tracking period to help generate a sensor reliability function for each one of the plurality of sensors 205 using each one of the plurality of different fusion methods (shown in Appendix A). Thereafter, adaptive processor 207 may execute (perform) a predetermined algorithm incorporating additive, multiplicative, fuzzy logic (e.g., minimum-maximum), or other calculation (of each individual sensor reliability function) to generate at least one overall (combined) reliability function for the multi-sensor system (full plurality of sensors). As part of generating the overall reliability function (for the plurality of sensors) in accordance with the algorithm (process), adaptive processor 207 may adaptively weight (for a predetermined number of frames) each sensor reliability function based on the SNR (a measure of individual sensor reliability or confidence level) for each sensor during the tracking period.

However, under certain conditions (e.g., conditions causing a false alarm rate above a predetermined threshold), the fused (combined) reliability result determined (generated) by adaptive processor 207 for the (entire) plurality of sensors (during the tracking period) may not be better than the individual sensor reliability result calculated from the performance of a better single sensor (e.g., the higher reliability sensor having the higher SNR). Therefore, adaptive processor 207 may use at least one additional predetermined sensor parameter (attribute) to better determine individual sensor reliability (function) weighting based on whether or not a data fusion result (generated from each sensor contributing) provides a more reliable result than a reliability result from a (better performing) single sensor.

Relying on predetermined measurements and analysis (e.g., testing and/or computer simulation of sensor operation), adaptive processor 207 may use the comparative (relative) received operating characteristics (ROC) between each sensor (for each different fusion method) as the additional sensor parameter to help determine reliability weighting for each one of the plurality of sensors 205 during a predetermined tracking period. The ROC performance (curve) for each one of the plurality of sensors 205 may be generated (determined) using likelihood functions to represent (characterize) sensor information (during target tracking) such as (target) detections, no detections, measured SNRs, and other sensor information obtained from sensor measurements, observations, or other sensor data outputs. Thereafter, the ROC likelihood function for each sensor may be combined to generate likelihood (probability) functions of correct classification (recognition) of target and decoy (false target) for system 200.

Advantageously, the predetermined ROC performance (as shown in FIGS. 5, 6), predetermined calculations of other parameters (e.g., critical false alarm rate for system 200), and other predetermined fusion method results may be entered into a fusion table and input to adaptive processor 207 along with the other data (e.g., SNR measurements) from the plurality of sensors 205 to use during performance of the predetermined algorithms (to generate weighted reliability functions and data fusion results) executed by processors 207, 208. For one example of the fusion table content, the fused reliability performance (e.g., probability of correct classification of target and/or decoy) using additive fusion may be better than the single sensor reliability performance when a critical false alarm rate is not reached (satisfied) as shown in FIG. 5c. This predetermined fusion method result may be part of the fusion table and used by adaptive processor 207 for adaptive weighting (e.g., weighting the additive fusion result more) of the individual/combined sensor reliability functions. Another example of better additive fusion performance (put in the fusion table input to adaptive processor 207) may be when the likelihood function readings (values) are close to zero as occurs when the readings are from the tails of a bell-shaped likelihood function (for each sensor). For this exemplary embodiment, adaptive processor 207 may assign (via additive fusion) a greater weight to the sensor contributions from peak readings since readings from the peaks of the likelihood functions are more reliable than the readings from the tails. For an accurate measure of the reliability weighting for this embodiment, adaptive processor 207 may use the BPA (basic probability assignment) of the empty sets calculated from a predetermined Dempster-Shafer computation as the BPA of the empty sets is near one when the likelihood reading is near zero, and the BPA is near zero when the likelihood reading is near the peak of the likelihood function.

Also, using the predetermined Dempster-Shafer computation, SNR may be calculated from a summation of ignorance sets as a measure of the noise intensity. Additionally, in response to the fusion table input, fusion selection processor 208 may delay fusion and/or decision output 210 if the measured values of the empty sets are low or the measured values of the ignorance sets are high at a predetermined, particular time frame (indicating a low confidence of correct classification for the particular time frame). The predetermined Dempster-Shafer computation is disclosed in the cross-referenced provisional application Ser. No. 60/367,282, filed Mar. 26, 2002.

For multi-sensor system 200, generation of the likelihood (probability) functions for correct classification ($P_{cc}$) of target and decoy using ROC likelihood function generation may include predetermination of the likelihood function for individual sensor noise caused by temporal fusion (diversity) as each sensor (auto) correlates data from multiple time frames (e.g., 120 time frames) during a predetermined tracking period. The temporal noise measurements (errors) for each one of the plurality of sensors 205 may be represented as a random variable (RV) where the negative impact of RV may be reduced using a plurality of methods including spatial and temporal fusion methods (used to combine data from differently located sensors and/or a single sensor outputting a plurality of data frames) to increase the probability of correct classification for a target and/or decoy ($P_{cc}$, $P_{ct}$). Spatial and temporal fusion methods may be used to generate a combined likelihood (pdf) function for differently located sensors and/or sensors having a plurality of data time frames.

ROC (received operating characteristics) performance curves may be generated using a plurality of methods including calculation of the combined probability density function (pdf or likelihood function) for the plurality of different fusion methods (likelihood functions shown in Appendix A). The methods may be based on a two-object (e.g., target—t, decoy—d), spatial fusion example (e.g., IR and RF sensor) where the likelihood functions (representing $P_{cc}$) may be expressed as p(t1), p(d1) for a first sensor (sensor1—IR), and by p(t2), p(d2) for a second sensor (sensor2—RF).

Alternatively, ROC curves may be generated using computer simulations (calculations) to generate a high number of random samples (e.g., 10,000) to represent RVs with different pdfs. Thereafter, the combined pdfs may be determined from the histograms of combined RVs based on the different fusion methods (shown in Appendix A). Exemplary diagrams of ROC performance curves (generated using the alternative method) representing the probability of correct classification (versus probability of false alarm) for the plurality of sensors 205 of system 200 are shown in FIGS. 5a–5h in accordance with an embodiment of the present invention. The probability of false alarm is the probability that a target or decoy is detected when actually there is no target or decoy (within the field of view of the plurality of sensors 205).

Figure 5A:
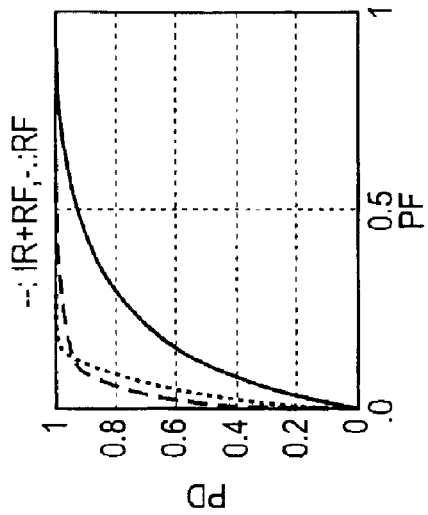
FIGS. 5a–5h show diagrams of exemplary sensor classification results for a multi-sensor system using additive and multiplicative fusion in accordance with embodiments of the present invention.
Figure 5C:
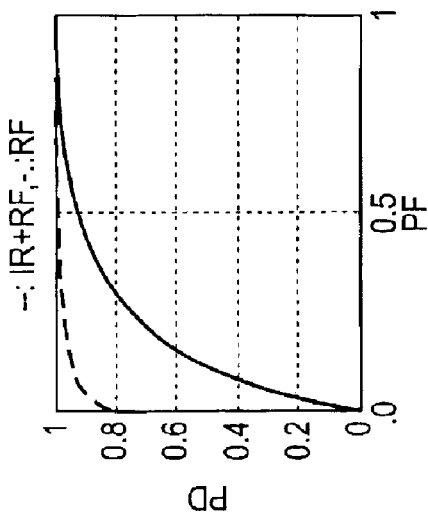
Figure 5B:
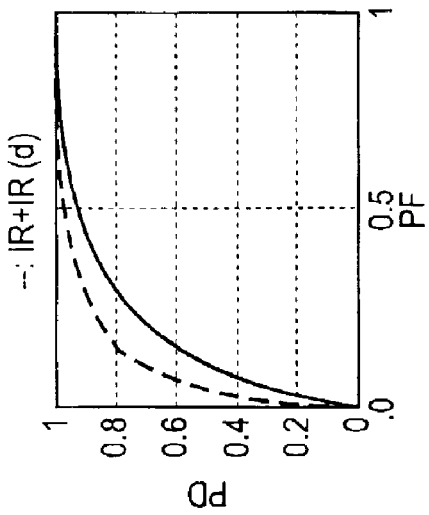

FIGS. 5a, 5b show exemplary curves of the probability of correct classification of decoy ($P_{cd}$—FIG. 5a) and target ($P_{ct}$—FIG. 5b) versus (vs.) probability of false alarm ($P_f$), respectively, for system 200 that may be generated using additive temporal fusion (shown in Appendix A) across two time frames of one of the sensors 205 (e.g., an IR sensor). FIGS. 5e, 5f show exemplary curves of the probability of correct classification of decoy ($P_{cd}$—FIG. 5e) and target ($P_{ct}$—FIG. 5f) versus (vs.) probability of false alarm ($P_f$), respectively, for system 200 that may be generated using multiplicative temporal fusion (shown in Appendix A) across two time frames of one of the sensors 205 (e.g., an IR sensor). For FIGS. 5a, 5b, 5e, 5f, the solid curves show the $P_{cc}$ performance of each individual time frame, and the dashed curves show the fused $P_{cc}$ performance across two time frames.

As shown in FIGS. 5a, 5b, 5e, 5f, the fused Pcc performance (dashed curve) for both additive and multiplicative temporal fusion may be better (probability of correct classification closer to 1) than the individual time frame performance since the RVs in different time frames have similar means and standard deviations.

Figure 5D:
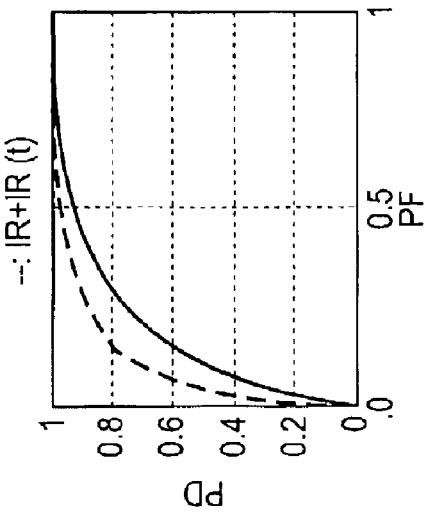
Figure 5G:
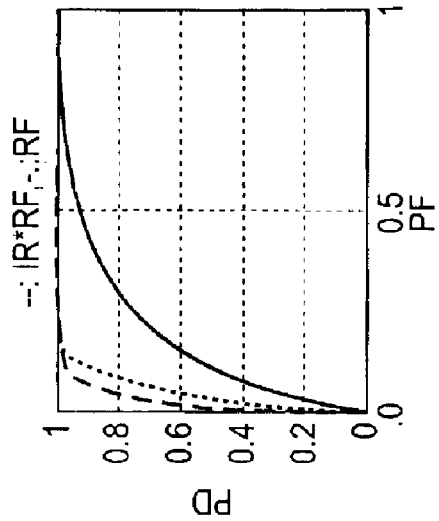
Figure 5H:
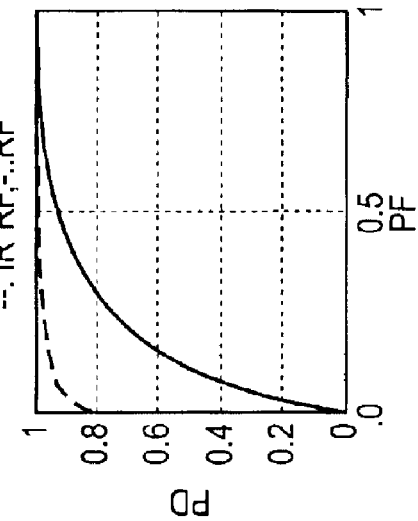
Figure 5E:
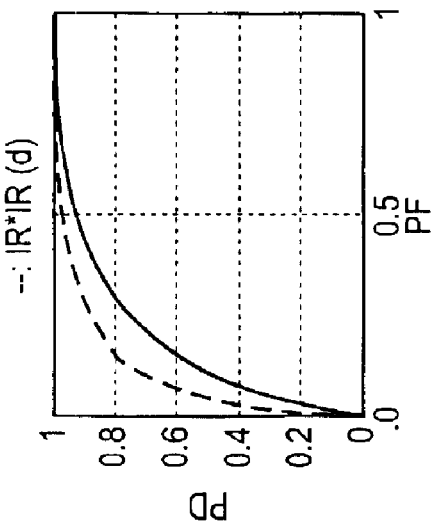
Figure 5F:
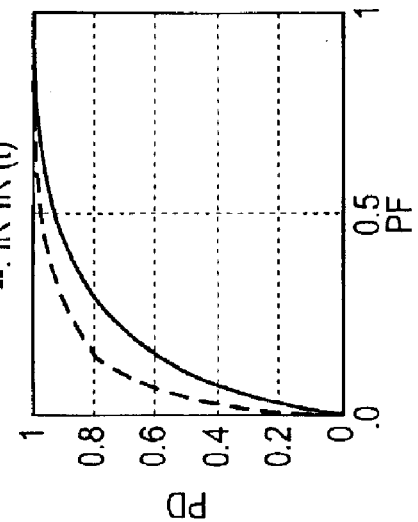

FIGS. 5c, 5d show exemplary curves of the probability of correct classification of decoy ($P_{cd}$—FIG. 5c) and target ($P_{ct}$—FIG. 5d) versus (vs.) probability of false alarm ($P_f$), respectively, for system 200 that may be generated using additive spatial fusion (shown in Appendix A) between the plurality of sensors 205 (e.g., IR sensor and RF sensor). FIGS. 5g, 5h show exemplary curves of $P_{cd}$ (FIG. 5g) and $P_{ct}$ (FIG. 5h) vs. $P_f$, respectively, for system 200 that may be generated using multiplicative spatial fusion (shown in Appendix A) between the plurality of sensors 205 (e.g., IR sensor and RF sensor).

For FIGS. 5c, 5d, 5g, 5h, the solid curves show the $P_{cc}$ (ROC) performance of a single IR sensor, the dot-dashed curves show the $P_{cc}$ performance of a single RF sensor, and the dashed curves show the fused $P_{cc}$ performance between the RF and IR sensors. The exemplary curves shown in FIGS. 5c, 5d, 5g, 5h may be generated using an RF sensor and an IR sensor, but it is noted that the selection of these sensors is solely exemplary and should not be viewed as a limitation upon the invention.

As shown in FIGS. 5c, 5d, 5g, 5h, the fused $P_{cd}$ performance (dashed curve) for both additive and multiplicative fusion may be better (probability of correct classification closer to 1) than the single sensor performance of either the RF or IR sensor where (as shown in FIGS. 5c, 5g) the RF sensor is the better individual (single) sensor. Alternatively, as shown in FIGS. 5d, 5h, the single RF sensor performance (dot-dashed curve) may be better than either the fused $P_{ct}$ performance for both additive and multiplicative fusion or the single IR sensor performance.

As shown in FIGS. 5d, 5h, when the plurality of sensors 205 have very dissimilar ROC performances (showing a large difference), the fused ROC ($P_{cc}$) performance may be worse than the better single sensor (e.g., RF) ROC performance, but still better than the worse single sensor (e.g., IR) ROC performance which may indicate that the worse single sensor is negatively impacting (dragging down) the fused ROC performance. In response to this situation, adaptive processor 207 may assign less weight to the contribution (sensor reliability function) generated from the worse sensor (e.g., IR) such that the fused (combined) system reliability function generated by processor 207 is weighted more towards the contribution (sensor reliability function) generated from the better single sensor (e.g., RF) to improve system reliability.

Also, as shown in FIGS. 5c, 5g, the fused ROC performance is only better than the better single sensor ROC performance when a Pf threshold (calculated critical false alarm rate or probability of false alarm threshold) is not reached (satisfied) as the fused and better single sensor ROC performances curves reach substantially the same value (approximately a probability of 1) after this $P_f$ threshold is reached. In response to this situation, adaptive processor 207 may generate a system (combined) reliability function based on each sensor SNR and an F/S ratio where the F/S ratio may represent the ratio between the fused ROC performance and the better single sensor ROC performance and be dependent on a false alarm rate (fa) function and the critical false alarm rate.

Also, exemplary diagrams of fused ROC performance curves (also generated using the alternate random sampling method) representing the probability of correct classification (versus probability of false alarm) for the plurality of sensors 205 of system 200 (using four different fusion methods) are shown in FIGS. 6a–6d in accordance with embodiments of the present invention. The four different fusion methods may include additive, multiplicative, minimum (fuzzy logic), and maximum (fuzzy logic) fusion methods as shown in Appendix A.

Figure 6A:
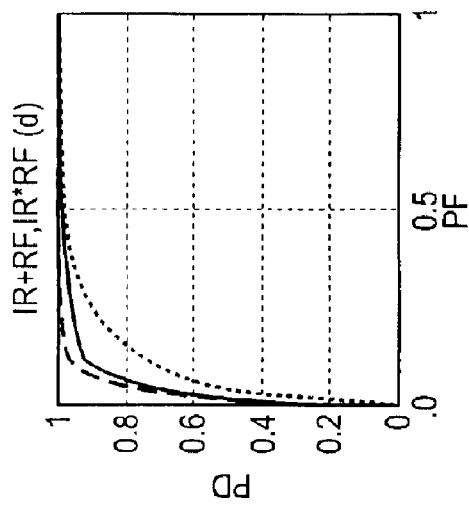
FIGS. 6a–6d show diagrams of exemplary sensor classification results for a multi-sensor system using multiple fusion methods in accordance with embodiments of the present invention.
Figure 6B:
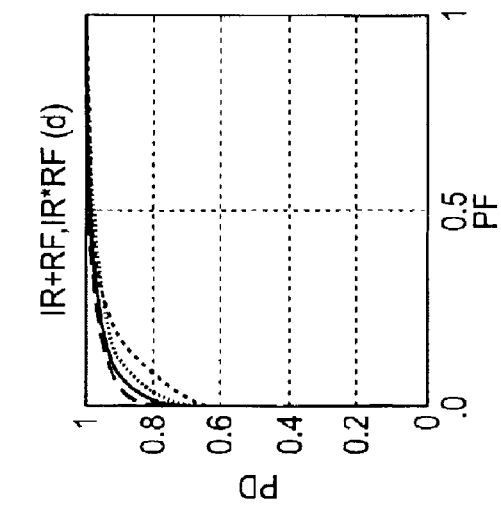
Figure 6C:
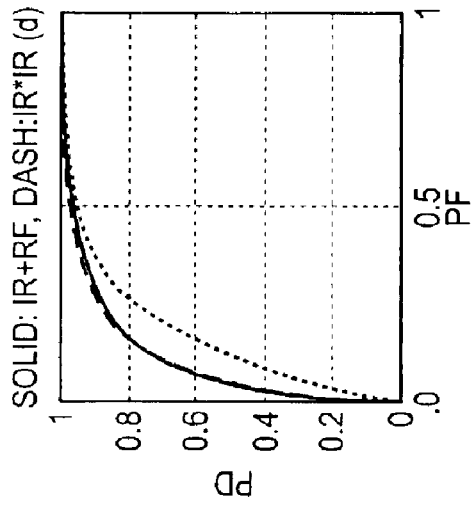
Figure 6D:
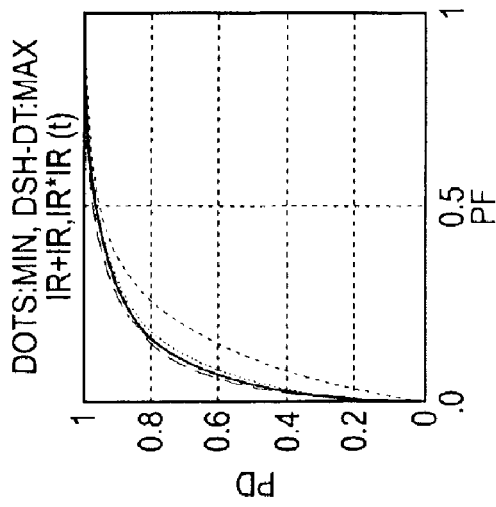

FIGS. 6a, 6b show exemplary curves of the probability of correct classification of decoy ($P_{cd}$—FIG. 6a) and target ($P_{ct}$—FIG. 6b) versus (vs.) probability of false alarm ($P_f$), respectively, for system 200 that may be generated using all four different methods of temporal fusion (shown in Appendix A) across two time frames of sensors 205 (e.g., an IR sensor) for all four fusion methods. FIGS. 6c, 6d show exemplary curves of $P_{cd}$ (FIG. 6c) and $P_{ct}$ (FIG. 6d) vs. $P_f$, respectively, for system 200 that may be generated using all four methods of spatial fusion (shown in Appendix A) between the plurality of sensors 205 (e.g., IR sensor and RF sensor).

For FIGS. 6a, 6b, the solid curves show the fused $P_{cc}$ (ROC) performance (of the single IR sensor) using additive temporal fusion, the dot-dashed curves show the fused $P_{cc}$ performance using maximum (fuzzy logic) temporal fusion, the dashed curves show the fused $P_{cc}$ performance using multiplicative temporal fusion, and the dotted curves show the fused Pcc performance using minimum (fuzzy logic) temporal fusion.

As shown in FIGS. 6a, 6b, maximum temporal fusion is the worst among the four temporal diffusion methods as its fused $P_{cc}$ performance (dot-dashed curve) shows no improvement from the performance of a single frame while the other three fusion methods (minimum, additive, and multiplicative) do show improvement across the two time frames.

For FIGS. 6c, 6d, the solid curves show the fused $P_{cc}$ (ROC) performance between sensors 205 (e.g., an IR and RF sensor) using additive spatial fusion, the dot-dashed curves show the fused $P_{cc}$ performance using maximum (fuzzy logic) spatial fusion, the dashed curves show the fused $P_{cc}$ performance using multiplicative spatial fusion, and the dotted curves show the fused $P_{cc}$ performance using minimum (fuzzy logic) spatial fusion.

As shown in FIG. 6c, the fused $P_{cd}$ performances for multiplicative and maximum fusion methods are better (probability closer to 1) than additive fusion. Alternatively, as shown in FIG. 6d, the fused $P_{ct}$ performance for additive fusion is better than the multiplicative and maximum fusion methods.

In accordance with embodiments of the present invention, (simulated) results of the four different temporal fusion algorithms (as shown in Appendix A) performed by multi-sensor system 200 are shown in FIG. 3. FIGS. 3a, 3b show diagrams of exemplary IR sensor reliability functions of $P_{ct}$ and $P_{cd}$ for temporal fusion across four time frames of target and decoy performance data, respectively. As shown in FIGS. 3a, 3b, the maximum temporal fusion performs worse than the other three fusion methods. FIGS. 3c, 3d show diagrams of exemplary RF sensor reliability functions of $P_{ct}$ and $P_{cd}$ for temporal fusion across four time frames of target and decoy performance data, respectively. As shown in FIGS. 3c, 3d, the RF sensor is the better sensor (as compared to the IR sensor in FIGS. 3a, 3b) as only two time frames of temporal fusion (integration) may be required to increase the $P_{ct}$ to 100%, and only four time frames of temporal integration may be required to increase the $P_{cd}$ to 100%.

Also, in accordance with embodiments of the present invention, (simulated) results of additive and multiplicative spatial fusion algorithms (as shown in Appendix A) performed by multi-sensor system 200 for plurality of sensors 205 (e.g., IR and RF sensor) are shown in FIG. 4. FIG. 4 includes the $P_{ct}$, $P_{cd}$, $P_f$, and $P_{mc}$ (probability of misclassification) probabilities during low and high SNR conditions for both fusion methods. As shown in FIGS. 4a, 4b for low SNR conditions using additive fusion, the $P_{ct}$ may be improved to 95% (as compared to $P_{ct}$ of 80% with prior art classification schemes that fail to use temporal/spatial fusion), and the $P_{cd}$ may be improved to 88% (as compared to $P_{cd}$ of 76% with prior art classification schemes). Also, as shown in FIGS. 4b, 4d for low SNR conditions, the fused performance (Pct of 95% and 96% for additive and multiplicative fusion, respectively) is worse than the performance of the better single RF sensor ($P_{ct}$ of 98% as predetermined using the random sampling method). Also, as shown in FIGS. 4a, 4c, even for high SNR conditions the fused $P_{ct}$ performance ($P_{ct}$ of 97% for both additive and multiplicative fusion) is worse than the performance of the better single RF sensor ($P_{ct}$ of 98% as predetermined using the random sampling method). Alternatively, as shown in FIGS. 4a, 4c with high SNR, the fused $P_{cd}$ performance ($P_{cd}$ of 96% and 97% for additive and multiplicative fusion, respectively) is better than the performance of the better single RF sensor ($P_{cd}$ of 92% as predetermined using the random sampling method).

As described herein, the sensor classification results shown in FIGS. 3–6 may be part of the fusion table input to processors 207, 208 to help adaptively determine/select the best fusion method, adaptively weight different sensor contributions based on individual sensor reliability functions, and adaptively select and execute a fusion method or predetermined combination of multiple fusion methods during the current time frame or delay data fusion to a future time frame based on predetermined criteria including flight conditions and situations, reliabilities of different sensors, weather conditions, SNR, range, classification confidence, or other criteria.

A plurality of advantages may be provided in accordance with embodiments of the present invention including a data fusion selection method that adaptively weights the contributions from different sensors (within a multi-sensor system) using multiple fusion methods to generate a plurality of different system reliability functions (wherein one or a predetermined combination is selected in accordance with predetermined criteria) where SNR and relative ROC performance between sensors may be used as measures of reliability.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

Appendix A

Additive Fusion $p(t)=p(t1)+p(t2)$, and $p(d)=p(d1)+p(d2)$.

For two independent random variables (RVs), X and Y, the combined pdf of the summation of these two RVs (Z=X+Y) may be calculated as the convolution of the two individual pdfs:

$f_z(z) = \int f_x(x) f_y(z-x)dx$ (from 0 to ∞).

For an additive fusion example, $f_{p(t)}(p(t)) = \int f_{p(t1)}(p(t1)) f_{p(t2)}(p(t)-p(t1)) dp(t1)$ (from 0 to ∞), and $f_{p(d)}(p(d)) = \int f_{p(d1)}(p(d1)) f_{p(d2)}(p(d)-p(d1)) dp(d1)$ (from 0 to ∞).

The fused classification performance of the ROC curves may be estimated from the combined probability density functions (pdfs) in the above equations where the results are shown in FIGS. 7a–7d.

Multiplication (the Bayes) Fusion $p(t)=p(t1)*p(t2)$, and $p(d)=p(d1)*p(d2)$.

For two independent RVs, X and Y, the combined pdf of the multiplication of these two RVs (Z=X*Y) may be calculated as the nonlinear convolution of the two individual pdfs:

$$f_z(z)=\int (1/|x|)f_x(x)f_y(z/x)dx \text{ (from 0 to } \infty).$$

For a multiplication fusion example, $$f_{p(t)}(p(t))=\int 1/|p(t1)|f_{p(t1)}(p(t1))f_{p(t2)}(p(t)/p(t1))dp(t1) \text{ (from 0 to } \infty),$$

and $$f_{p(d)}(p(d))=\int 1/|p(d1)|f_{p(d1)}(p(t1)f_{p(d2)}(p(d)/p(d1))dp(d1) \text{ (from 0 to } \infty).$$

The Relationship Between Additive and Multiplication Fusions

If the logarithm on both sides of the above-identified multiplication fusion equations is performed, then $$ln[p(t)]=ln[p(t1)]+ln[p(t2)], \text{ and } ln[p(d)]=ln[p(d1)]+ln[p(d2)].$$

The one multiplication term becomes two additive terms of logarithm functions in each of the equation. If two RVs have log-normal pdfs, the equations above indicate that the multiplicative fusion of two RVs with log-normal distributions may be equivalent to the additive fusion of two RVs with normal distributions.

MIN, MAX, and MINMAX Fusions

The conjunction (AND) and disjunction (OR) are two well-known functions used in Fuzzy Logics. For two independent RVs: X and Y, the combined pdf of the conjunction of these two RVs [Z=min(X, Y)] may be given as:

$$f_z(z)=f_x(z)[1-F_y(z)]+f_y(z)[1-F_x(z)].$$

where F(z) is the cumulative distribution function.

Similarly, for two independent RVs: X and Y, the combined pdf of the disjunction of these two RVs [Z=max(X, Y)] may be given as:

$$f_x(z)=f_x(z)F_y(z)+f_y(z)F_x(z).$$

For a two-object example, the MIN (conjunction) fusion may be defined as:

$$p(t)=min[p(t1), p(t2)], \text{ and } p(d)=min[p(d1), p(d2)]$$

The MAX (disjunction) fusion may be defined as:

$$p(t)=max[p(t1), p(t2)], \text{ and } p(d)=max[p(d1), p(d2)].$$

This MINMAX fusion strategy may enhance one class (e.g., the target) over the other (e.g., the decoy). In some situations (e.g., target is the incoming missile warhead and the system is attempting to intercept the missile), the Pcc for the target should be as high as possible although the false alarm rate will be similarly increased. At the detection stage, the CFAR (constant false-alarm ratio) may be modified to change the Pd. At higher feature levels of fusion, the MINMAX fusion method may be used for this purpose.

For enhancing the target, $$p(t)=max[p(t1), p(t2)], \text{ and}$$

$$p(d)=min[p(d1), p(d2)].$$

For enhancing the decoy, $$p(t)=min[p(t1), p(t2)], \text{ and}$$

$$p(d)=max[p(d1), p(d2)].$$

What is claimed is:

1. A method for integrating data received from a plurality of sensors, comprising:
   receiving data from a plurality of sensors having overlapping scanning areas;
   determining a S/N (signal-to-noise) ratio for each sensor based on signal measurements of the received data;
   determining a plurality of reliability functions for the plurality of sensors from using a plurality of predetermined calculations combining each sensor reliability function which are determined and individually weighted based on said S/N ratio for each sensor and differences between predetermined operating characteristics for each sensor;
   selecting one or a predetermined combination of said plurality of reliability functions as a current reliability function based on the selected one or predetermined combination satisfying predetermined threshold; and
   determining the presence or absence of an object of interest within the overlapping scanning areas, based upon data from the sensors and at least one selected reliability function.

2. The method of claim 1, further comprising:
   determining to delay said selecting for a predetermined time period based on said selected at least one failing to satisfy said predetermined threshold.

3. The method of claim 1, wherein said determining a plurality of reliability functions includes determining said plurality of reliability functions from using one of a predetermined additive, multiplicative, and fuzzy logic calculation combing each sensor reliability function.

4. A method according to claim 1, wherein the overlapping scanning areas form a search area within which the object of interest is located.

5. The method of claim 1, wherein said determining a plurality of reliability functions includes determining said individual weighting based on a predetermined parameter for the plurality of sensors satisfying a predetermined threshold, and determining said plurality of reliability functions, based on using said plurality of predetermined calculations for a single sensor reliability function, when said predetermined parameter fails to satisfy said predetermined threshold.

6. The method of claim 1, wherein said determining a plurality of reliability functions includes determining said plurality of reliability functions based on differences between probabilities of classification for each sensor as compared to a single sensor having the highest probability of classification.

7. The method of claim 1, wherein said plurality of sensors includes at least one of a laser, IR (infrared), and RF (radio frequency) sensor.

8. The method of claim 1, wherein said determining a plurality of reliability functions includes determining said plurality of reliability functions based on determining a single sensor, as compared to the plurality of sensors, as having the best performance for at least one predetermined sensor parameter.

9. The method of claim 8, wherein said at least one predetermined sensor parameter is one of operating characteristics and S/N ratio for said single sensor.

10. The method of claim 9, wherein said single sensor is one of a laser, IR, and RF sensor.

11. The method of claim 1, wherein said selecting includes selecting said current reliability function to increase the probability of classifying one of a target and decoy above a predetermined threshold.

12. A method for integrating data received from a plurality of sensors, comprising:

receiving data from a plurality of sensors;

determining a S/N (signal-to-noise) ratio for each sensor based on signal measurements of the received data;

determining a plurality of reliability functions for the plurality of sensors from using a plurality of predetermined calculations combining each sensor reliability function which are determined and individually weighted based on said S/N ratio for each sensor and differences between predetermined operating characteristics for each sensor; and selecting one or a predetermined combination of said plurality of reliability functions as a current reliability function based on the selected one or predetermined combination satisfying predetermined thresholds;

wherein said determining a plurality of reliability functions includes determining said plurality of reliability functions from using one of a predetermined additive, multiplicative, and fuzzy logic calculation combing each sensor reliability function; and wherein said determining a plurality of reliability functions includes determining empty sets and ignorance sets for the received data from the plurality of sensors based on said predetermined multiplicative calculation.

13. The method of claim 12, wherein said predetermined multiplicative calculation includes at least a modified portion of a Dempster's data fusion algorithm.

14. A method according to claim 12, wherein each sensor includes an overlapping scanning area and the overlapping scanning areas form a search area within which the object of interest is located.

15. A method for integrating data received from a plurality of sensors, comprising:

receiving data from a plurality of sensors;

determining a S/N (signal-to-noise) ratio for each sensor based on signal measurements of the received data;

determining a plurality of reliability functions for the plurality of sensors from using a plurality of predetermined calculations combining each sensor reliability function which are determined and individually weighted based on said S/N ratio for each sensor and differences between predetermined operating characteristics for each sensor; and selecting one or a predetermined combination of said plurality of reliability functions as a current reliability function based on the selected one or predetermined combination satisfying predetermined thresholds;

wherein said determining a plurality of reliability functions includes determining said individual weighting based on a predetermined parameter for the plurality of sensors satisfying a predetermined threshold, and determining said plurality of reliability functions, based on using said plurality of predetermined calculations for a single sensor reliability function, when said predetermined parameter fails to satisfy said predetermined threshold;

wherein said predetermined parameter is a false alarm rate for the plurality of sensors.

16. A method according to claim 15, wherein each sensor includes an overlapping scanning area and the overlapping scanning areas form a search area within which the object of interest is located.

17. A multi-sensor system, comprising:

a plurality of sensors for receiving data having overlapping scanning areas; and at least one controller for performing the steps of:

determining a S/N (signal-to-noise) ratio for each sensor based on signal measurements of the received data;

determining a plurality of reliability functions for the plurality of sensors from using a plurality of predetermined calculations combining each sensor reliability function which are determined and individually weighted based on said S/N ratio for each sensor and differences between predetermined operating characteristics for each sensor;

selecting one or a predetermined combination of said plurality of reliability functions as a current reliability function based on the selected at least one satisfying a predetermined threshold; and determining the presence or absence of an object of interest within the overlapping scanning areas, based upon data from the sensors and at least one selected reliability function.

18. The system of claim 17, wherein said controller to determine said individual weighting based on a predetermined parameter for the plurality of sensors satisfying a predetermined threshold, and said controller to determine said plurality of reliability functions, based on using said plurality of predetermined calculations for a single sensor reliability function, when said predetermined parameter fails to satisfy said predetermined threshold.

19. A system according to claim 17, wherein the overlapping scanning areas form a search area within which the object of interest is located.

20. The system of claim 17, wherein said plurality of sensors includes at least one of a laser, IR (infrared) sensor, and RF (radio frequency) sensor.

21. A method for integrating data received from a plurality of sensors, comprising:

receiving data from a plurality of sensors;

determining a S/N (signal-to-noise) ratio for each sensor based on signal measurements of the received data;

determining a plurality of reliability functions for the plurality of sensors from using a plurality of predetermined calculations combining each sensor reliability function which are determined and individually weighted based on said S/N ratio for each sensor and differences between predetermined operating characteristics for each sensor; and selecting one or a predetermined combination of said plurality of reliability functions as a current reliability function based on the selected one or predetermined combination satisfying predetermined thresholds;

wherein said controller to determine said individual weighting based on a predetermined parameter for the plurality of sensors satisfying a predetermined threshold, and said controller to determine said plurality of reliability functions, based on using said plurality of predetermined calculations for a single sensor reliability function, when said predetermined parameter fails to satisfy said predetermined threshold;

wherein said predetermined parameter is a false alarm rate for the plurality of sensors.

22. A method according to claim 21, wherein each sensor includes an overlapping scanning area and the overlapping scanning areas form a search area within which the object of interest is located.

23. A machine-readable medium having stored thereon a plurality of executable instructions, the plurality of instructions comprising instructions to:

receive data from a plurality of sensors having overlapping scanning areas;

determine a S/N (signal-to-noise) ratio for each sensor based on signal measurements of the received data;

determine a plurality of reliability functions for the plurality of sensors from using a plurality of predetermined calculations combining each sensor reliability function which are determined and individually weighted based on said S/N ratio for each sensor and differences between predetermined operating characteristics for each sensor; and select at one or a predetermined combination of said plurality of reliability functions to use as a current reliability function based on the selected at least one satisfying a predetermined threshold; and determine the presence or absence of an object of interest within the overlapping scanning areas, based upon data from the sensors and at least one selected reliability function.

24. The medium of claim 23, wherein said instructions to determine a plurality of reliability functions include instructions to determine said individual weighting based on a predetermined parameter for the plurality of sensors satisfying a predetermined threshold.

25. The medium of claim 23, wherein said instructions to determine a plurality of reliability functions include instructions to determine said plurality of reliability functions based on differences between probabilities of classification for each sensor as compared to a single sensor having the highest probability of classification.

26. The medium of claim 23, wherein said instructions to determine a plurality of reliability functions include instructions to determine said plurality of reliability functions from using one of a predetermined additive, multiplicative, and fuzzy logic calculation combining each sensor reliability function.

27. The medium of claim 23, wherein said instructions to select include instructions to select said current reliability function to increase the probability of classifying the object of interest, which corresponds to either a target or a decoy.

28. A medium according to claim 23, wherein the overlapping scanning areas form a search area within which the object of interest is located.

* * * * *